United States Patent [19]

Tolliver

[11] 4,295,497
[45] Oct. 20, 1981

[54] VARIEGATED STIRRUP MAT

[76] Inventor: Wilbur E. Tolliver, 364 Hamilton Dr., Holland, Mich. 49423

[21] Appl. No.: 36,170

[22] Filed: May 4, 1979

[51] Int. Cl.³ .................... F16L 55/00; B21F 27/20
[52] U.S. Cl. ............................ 138/175; 138/172; 140/107; 52/662
[58] Field of Search ............... 138/175, 172; 140/92.1, 140/107; 52/661, 662, 664, 669, 676; 139/386, 381 R, 425 R; 245/2

[56] References Cited

U.S. PATENT DOCUMENTS

| | | | |
|---|---|---|---|
| 2,717,615 | 9/1955 | Peckworth | 138/175 |
| 3,840,054 | 10/1974 | Tolliver | 138/175 |
| 3,857,416 | 12/1974 | Borodin et al. | 138/175 |
| 4,184,520 | 1/1980 | Tolliver | 52/662X |

FOREIGN PATENT DOCUMENTS

1006531 10/1965 United Kingdom .................. 52/664

*Primary Examiner*—James E. Bryant, III
*Attorney, Agent, or Firm*—Price, Heneveld, Huizenga & Cooper

[57] ABSTRACT

The specification discloses a method and stirrup mat for reinforcing concrete pipe which enables one to concentrate steel where it is needed at the area nearest the crown and invert of the pipe, yet still stirrup the entire area from 45 to 60 degrees to either side of the crown or invert. Also, by employing stirrups which are shorter towards the lateral edges of the mat than towards the center, one can use the present mat in an elliptical cage which is located in a round pipe or an elliptical pipe shaped wherein the elliptical cage is more elongated than the ellipse of the inner diameter of the pipe.

13 Claims, 4 Drawing Figures

VARIEGATED STIRRUP MAT

BACKGROUND OF THE INVENTION

The present invention relates to concrete pipe reinforcement. Typically, a circular or eliptical cage is formed of a network of interconnected longitudinal and circumferential wires. Concrete is then cast around this reinforcing cage to form a reinforced pipe.

In larger round or eliptical pipe, it is conventional to provide stirruping in the crown and invert areas of the pipe. Stirruping comprises a plurality of wire projections which project generally radially outwardly from the reinforcing cage. The stirrup projections extend along the length of the cage and extend to either side of the crown and invert from 45 to 60 degrees.

Stirruping used to be achieved by welding separate individual rods to the reinforcing cage at various points along the length and along a lateral or circumferential arc thereof. Others have used sinusoidal shaped stirrup members which extend the length of the pipe and comprise a plurality of projections from a single member. Other comparable stirrup members have also been conceived, and stirrup mats have become popular recently. In a stirrup mat, a network of interconnected wires defines a mat from which a plurality of stirrup projections project. The mat is then shaped to conform to the configuration of a cage in the crown and invert areas and is secured to the cage in those areas. It is designed to encompass 45 to 60 degrees to either side of the crown or invert.

The object of such stirruping is to reinforce the concrete pipe at its greatest tangential tensile stress, namely the crown and invert. As one proceeds to either side of the crown or invert, the tangential tensile stress forces begin to diminish and that is why stirruping is typically required only in the general area of the crown and invert, subtending a 45 to 60 degree angle to either side thereof. While the provision of such stirruping is costly, it is necessary in order to reinforce the concrete pipe sufficiently to prevent cracking of the pipe under load.

Stirruping also presents a problem in that the elliptical cage passes closer to the inside wall of the pipe at the crown and invert, but closer to the outer wall at the spring lines. The stirrups must be sufficiently tall to intercept the line of stress through the bulk of the wall of the pipe. Yet, the tall stirrups at the lateral edges of the 90° to 120° stirruped area tend to project through the pipe wall when the pipe is cast.

SUMMARY OF THE INVENTION

The method and stirrup mat of the present invention enable one to concentrate stirrup steel where it is needed at the area immediately adjacent the crown and invert, while still providing stirrup steel in the entire area from 45 to 60 degrees to either side of the crown and invert. However, the concentration of steel in the area immediately adjacent the crown and invert enables one to concentrate cost where it is most needed and minimize cost by minimizing the steel employed as one proceeds away from the crown and invert towards the extremes of the 45 to 60 degree angle to either side of the crown or invert.

These and other objects, advantages and features of the invention will be more fully understood and appreciated by reference to the written specification and appended drawings.

DESCRIPTION OF THE PREFERRED EMBODIMENT

Figure 1:
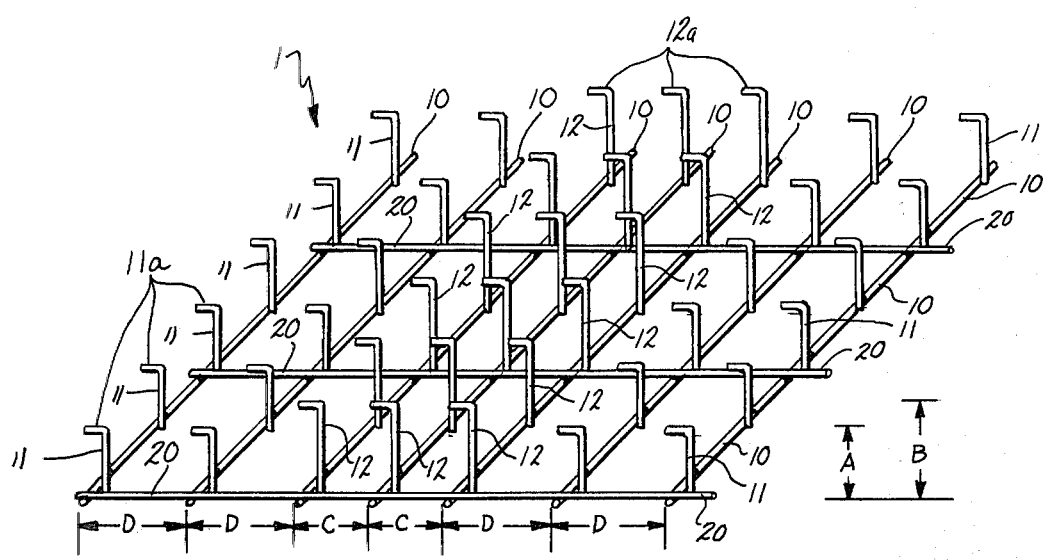
FIG. 1 is a perspective view of a stirrup mat made in accordance with the present invention.

In the preferred embodiment of the present invention, reinforcing stirrup mat 1 (FIG. 1) comprises a network of interconnected strands 10 and 20. Wire strands 10 comprise the longitudinal tie wires while wire strands 20 comprise the circumferential wires. That is to say, when stirrup mat 1 is formed and joined to a cage, longitudinal tie wires 10 will extend along the length of the cage and circumferential wires 20 will be curved to extend along the circumference of the cage 40 (hidden behind circumferential cage wire 41 in FIG. 2).

Projecting upwardly from mat 1 are a plurality of stirrup projections 11 and 12. Stirrup projections 11 are the two rows of projections arranged towards each lateral edge of mat 1. They have a height indicated by dimension A shown in FIG. 1 and they are spaced laterally from one another in accordance with dimension D as shown in FIG. 1. Each stirrup projection 11 includes a hooked upper end 11a as is sometimes done in stirruping.

Stirrup projections 12, on the other hand, are arranged in rows which are located towards the lateral center of mat 1. Each stirrup 12 has a height B as indicated in FIG. 1 which is greater than height A of stirrups 11. Further, the spacing C between adjacent rows for the stirrup projections 12 is less than the spacing D between adjacent rows of stirrups 11, and between that row of stirrup projections 11 which is located adjacent the next row of stirrup projections 12.

Figure 4:
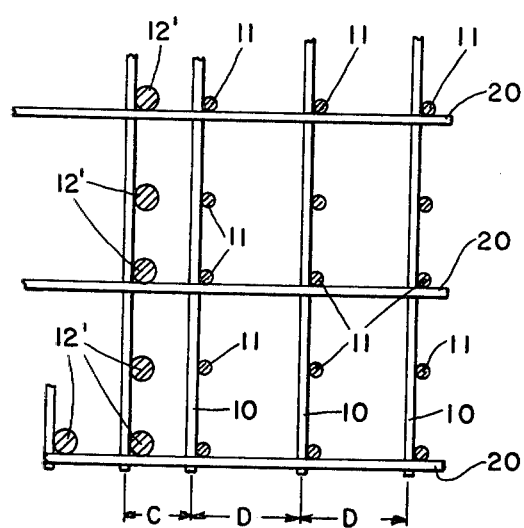
FIG. 4 is a fragmentary, plan view of a mat including alternative stirrup projections shown in horizontal cross section.

As a result of this invention, one concentrates steel in the area immediately adjacent either side of the crown and invert, and decreases the concentration of steel as one proceeds outwardly towards the 45 to 60 degree extremes to either side of the crown or invert. This concentration, as shown in the preferred embodiment, occurs in two senses. First, one concentrates more steel area in a given tangential cross section in the area nearest the crown or invert in that the rows of stirruping in that central area are spaced more closely together. This concentration can be enhanced by employing larger diameter projections as stirrup projections 12 although this is unnecessary. This is shown in FIG. 4 wherein the alternative and larger diameter projections are designated 12'. Projections 12' have a cross sectional area larger than that of projections 11.

The steel is concentrated in a second sense in that the stirrup projections 12 near the center are taller than the projections 11 towards the lateral edges of the mat. While this is not normally thought of as "concentration of steel", the term seems appropos in the context of the presented invention in that there is more steel in the central area of reinforcing than in the lateral areas.

Thus, for purposes of the present invention, the term "concentration" will be understood to have both of these meanings.

Figure 2:
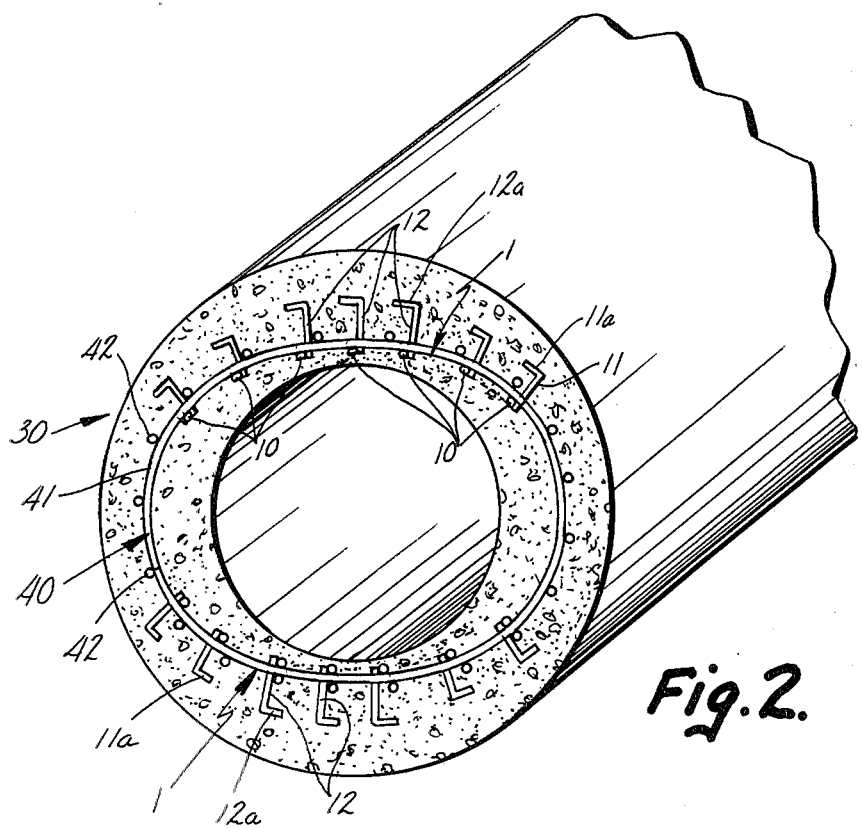
FIG. 2 is a cross sectional view taken through a concrete pipe reinforced in accordance with the present invention wherein the stirrup mat is shown in place within a reinforcing cage with the stirrup projections extending generally radially thereof.
Figure 3:
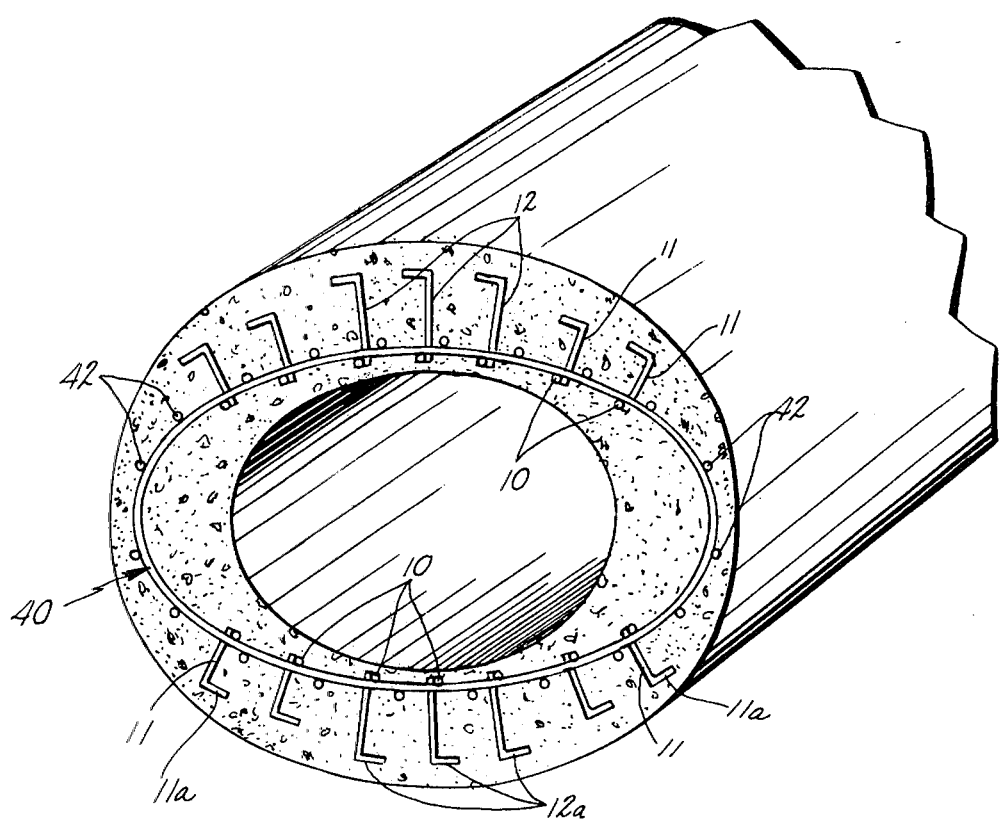
FIG. 3 is like FIG. 2, but the pipe is elliptical rather than round.

In any event, the projections 12 are sufficiently tall in the central area of the mat that they intercept the tangential stress through the substantial thickness of the pipe wall. Yet, the projections 11 towards the lateral side areas of mat 1 are sufficiently short that they do not project through the surface of the pipe wall (FIG. 2 and FIG. 3).

In contrast to this arrangement, a conventional stirrup mat would have stirrup projections of the same height throughout and arranged at the same intervals throughout the lateral extent of the mat. The manner in which the present invention effects savings over conventional methods is therefore apparent. In a conventional mat, all of the stirrup projections would have to be spaced together at a distance "C" throughout the mat in order to insure sufficient steel concentration at the central area of the mat. Similarly, all of the projections would have to have a height "B" in order to insure sufficient height in the center of the mat. Both these steps would lead to usage of more steel than a mat made in accordance with the present invention. Also, the stirrup projections at the lateral edges of the mat would be more likely to protrude through the pipe wall surface.

Longitudinal wires 10, circumferential wires 20 and stirrup projections 11 and 12 can be made of any conventional pipe reinforcing steel. In accordance with my invention set forth in my co-pending patent application Ser. No. 858,103, now U.S. Pat. No. 4,184,520 and entitled "Manually Formable Stirrup Mat Reinforcement", one may want to make sure the circumferential stirrup wires 20 are sufficiently narrow in diameter or otherwise sufficiently flexible that they can be manually curved into a circumferential arc so as to fit readily into position within the pipe reinforcing cage.

In practice, one would manually or mechanically form fabric mat 1 in accordance with the circumference of a reinforcing cage 40 for a concrete pipe and would insert mat 1 into the cage 40. Cage 40 is comprised of circumferential strands 41 joined by longitudinal strands 42. One mat 1 would be located and secured at the crown of the pipe and the other at the invert, with the larger projections 12 naturally being arranged to fall in the central area extending closely along either side of the crown or invert of the pipe. The extreme lateral edges of mat 1 would then define the lateral extent of the required angle to either side of the crown and invert.

Of course, it is understood that the above is merely a preferred embodiment of the invention and that various changes and alterations can be made without departing from the spirit and broader aspects of the invention as set forth in the appended claims. The claims are intended to define my invention and encompass all equivalents allowed by law.

The embodiments of the invention in which an exclusive property or privilege is claimed are defined as follows:

1. A concrete pipe comprising at least one cylindrical steel wire reinforcing cage, and concrete surrounding said cage, said cage including an additional reinforcing stirrup mat located in the area of the crown thereof and another located in the area of the invert thereof, each of said mats having lateral edges and a lateral center area and wherein stirrup projections project from each mat, said mats being defined by a network of interconnected wires, the improvement in said concrete pipe comprising: said cylindrical reinforcing cage being elliptical in lateral cross section and said stirrup projections being formed from steel and being taller in the lateral center area of said mat than towards the lateral edges thereof so as to concentrate more steel in the lateral center area of the mat than towards the lateral edges of the mat.

2. In a stirrup mat for reinforcing concrete pipe, in which a plurality of stirrup projections project from a mat defined by a network of interconnected wires, said mat having lateral edges and a lateral center area, and the improvement in said stirrup mat comprising: said stirrup projections being formed from steel and being arranged generally in longitudinal rows which are spaced laterally more closely together in the lateral center area of the mat than in the areas toward the lateral edges of the mat so as to concentrate more steel in the lateral center area of the mat than towards the lateral edges of the mat.

3. The stirrup mat of claim 2 in which said stirrup projections are taller in the lateral center area of said mat than towards the lateral edges thereof.

4. The mat of claim 3 in which those of said stirrup projections located in the lateral center area of said mat are larger in cross sectional area than those stirrup located towards the lateral edges of the mat.

5. In a stirrup mat for reinforcing concrete pipe, in which a plurality of stirrup projections project from a mat defined by a network of interconnected wires, said mat having lateral edges and a lateral center area, and the improvement in said stirrup mat comprising: said stirrup projections being formed from steel and being taller in the lateral center area of said mat than towards the lateral edges thereof so as to concentrate more steel in the lateral center area of the mat than towards the lateral edges of the mat.

6. In a stirrup mat for reinforcing concrete pipe, in which a plurality of stirrup projections project from a mat defined by a network of interconnected wires, said mat having lateral edges and a lateral center area, and the improvement in said stirrup mat comprising: said stirrup projections being formed from steel and those of said stirrup projections located in the lateral center area of said mat being larger in cross sectional area than those stirrups located towards the lateral edges of the mat so as to concentrate more steel in the lateral center area of the mat than at the lateral edges of the mat.

7. A concrete pipe comprising at least one cylindrical steel wire reinforcing cage, and concrete surrounding said cage, said cage including an additional reinforcing stirrup mat located in the area of the crown thereof and another located in the area of the invert thereof, each of said mats having lateral edges and a lateral center area and wherein stirrup projections project from each mat, said mats being defined by a network of interconnected wires, the improvement in said concrete pipe comprising: said cylindrical reinforcing cage being elliptical in lateral cross section, said stirrup projections being formed from steel and being arranged generally in longitudinal rows which are spaced laterally more closely together in the lateral center area of the mat than in the areas toward the lateral edges of the mat so as to concentrate more steel in the lateral center area of the mat than towards the lateral edges of the mat.

8. A concrete pipe comprising at least one cylindrical steel wire reinforcing cage, and concrete surrounding said cage, said cage including an additional reinforcing stirrup mat located in the area of the crown thereof and another located in the area of the invert thereof, each of said mats having lateral edges and a lateral center area and wherein stirrup projections project from each mat, said mats being defined by a network of interconnected wires, the improvement in said concrete pipe comprising: said stirrup projections being formed from steel and being arranged generally in longitudinal rows which are spaced laterally more closely together in the lateral center area of the mat than in the areas toward the lateral edges of the mat so as to concentrate more steel in the lateral center area of the mat than towards the lateral edges of the mat.

9. The pipe of claim 8 or 7 in which said stirrup projections are taller in the lateral center area of said mat than towards the lateral edges thereof.

10. The pipe of claim 9 in which those of said stirrup projections located in the lateral center area of said mat are larger in cross sectional area than those stirrups located towards the lateral edges of the mat.

11. The pipe of claim 8 in which those of said stirrup projections located in the lateral center area of said mat are larger in cross sectional area than those stirrups located towards the lateral edges of the mat.

12. A concrete pipe comprising at least one cylindrical steel wire reinforcing cage, and concrete surrounding said cage, said cage including an additional reinforcing stirrup mat located in the area of the crown thereof and another located in the area of the invert thereof, each of said mats having lateral edges and a lateral center area and wherein stirrup projections project from each mat, said mats being defined by a network of interconnected wires, the improvement in said concrete pipe comprising: said stirrup projections being formed from steel and being taller in the lateral center area of said mat than towards the lateral edges thereof so as to concentrate more steel in the lateral center area of the mat than towards the lateral edges of the mat.

13. The pipe of claim 12 in which said mat is oriented on an elliptical arc while the pipe is more circular in lateral cross section than said elliptical arc.

* * * * *

Disclaimer 4,295,497.—*Wilbur E. Tolliver*, Holland, Mich. VARIEGATED STIRRUP MAT. Patent dated Oct. 20, 1981. Disclaimer filed May 9, 1986, by the *inventor*.

Hereby enters this disclaimer to claims 1, 3, 5, 9, 12 and 13 of said patent.
[*Official Gazette October 21, 1986.*]